Dec. 17, 1957 G. A. VAN LEAR ET AL 2,816,451
SERVO-TORQUER SYSTEM
Filed March 16, 1955 2 Sheets-Sheet 1

INVENTORS.
GEORGE A. VAN LEAR,
WILLIAM J. GLASSON,
BY Henry Heyman
ATTORNEY.

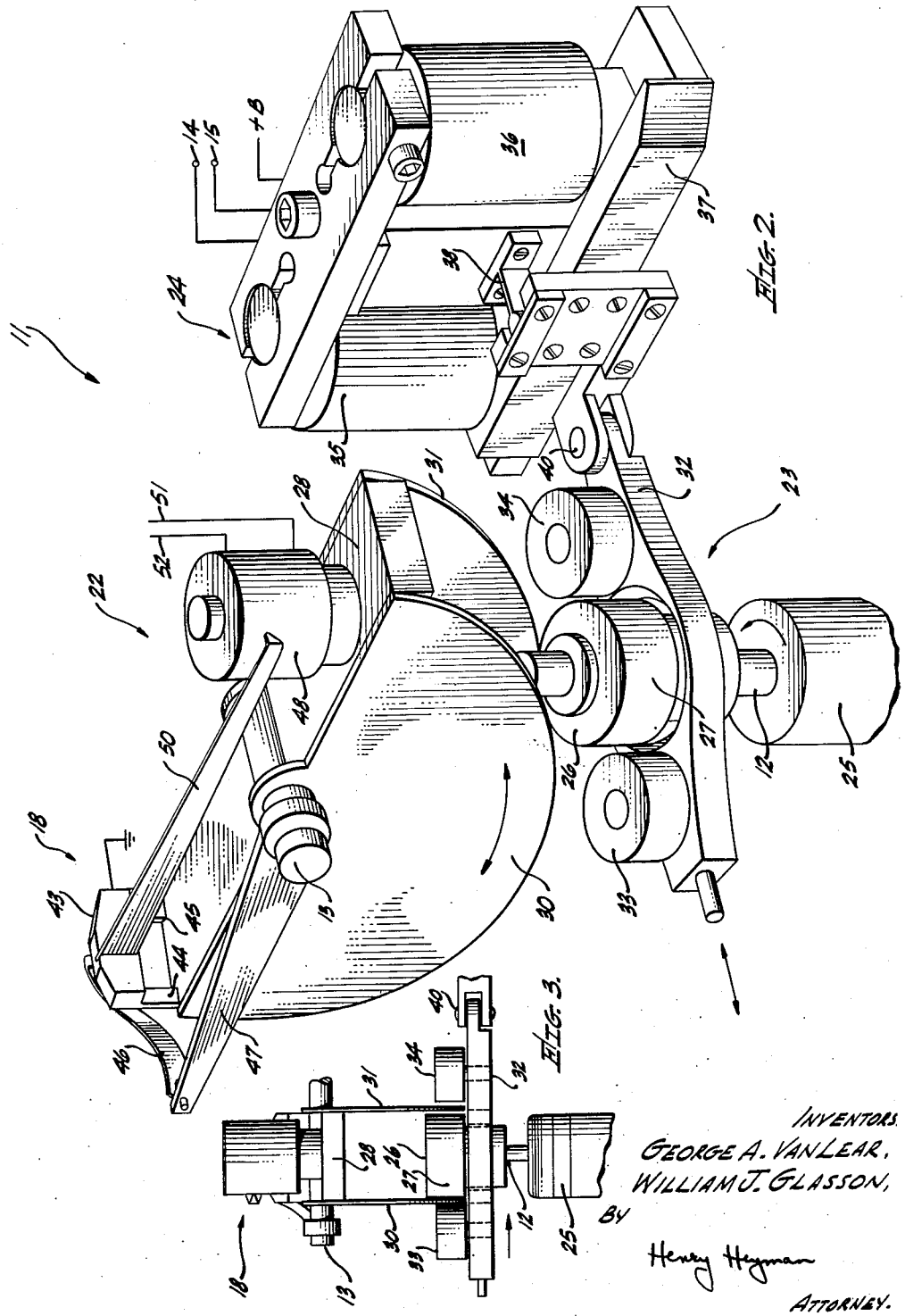

United States Patent Office 2,816,451
Patented Dec. 17, 1957

2,816,451

SERVO-TORQUER SYSTEM

George A. Van Lear, Palos Verdes Estates, and William J. Glasson, Los Angeles, Calif., assignors to Hughes Aircraft Company, Culver City, Calif., a corporation of Delaware Application March 16, 1955, Serial No. 495,254

8 Claims. (Cl. 74—202)

The present invention relates to servo-torquer systems, and more particularly to a clutch-type servo-torquer system in which the amplitude and direction of the torque presented at the output shaft of the system is a highly linear function of an applied electrical input signal.

There have heretofore been proposed a number of systems for producing torque forces on an output shaft in response to an applied input signal. Such systems as have heretofore been proposed, however, have suffered from a number of defects which have severely limited their fields of application. For example, where the system utilizes a direct electrical power-to-torque conversion element, such as a solenoid, the system becomes heavy and bulky, and the torque forces available are of limited range. Non-linearities between the applied electrical input signal and output torque are difficult to eliminate, since the control system is called upon to function linearly over the full power range corresponding to the output torque desired. For the same and similar reasons, such systems have high inertia, which severely limits the speed of response of the system, as well as increasing the power requirements. A further disadvantage of the prior art torquing systems is the dependency of the output torque on the angular position of the output member.

It is therefore an object of the present invention to provide a servo-torquer system for producing a variable and reversible torque on an output shaft which is a highly linear function of an applied electrical input signal.

A further object of the present invention is to provide a clutch-type servo-torquer system in which the amplitude and direction of the torque presented at the output shaft is continuously variable by means of an electrical input signal.

Another object of the present invention is to provide a clutch-type servo-torquer system having a high torque output and low inertia, yet having a minimum size and weight.

Another object of the present invention is to provide a servo-torquer system which produces an output torque independent of the angular position of the output member.

Yet another object of the present invention is to provide a clutch-type servo-torquer system having a wide range of torque output which is continuously and variably controllable by means of a control circuit operating at a relatively low power level.

Still a further object of the present invention is to provide a clutch-type servo-torquer system having a highly linear response to applied input signals, such non-linearities as may be present being compensated for by means of a feedback loop connected between a torque sensor mounted on the output shaft of the system and the electrical signal input point of the system.

According to the present invention, a clutch-type servo-torquer system comprises a torquing mechanism including an input shaft for receiving power from a rotating source of power; a torque transmitter coupled to an output shaft; and control means, responsive to an electrical input signal, for selectively and variably coupling said input shaft to said torque transmitter. In order to secure a highly linear relationship between the applied electrical input signal and the output torque of the system, there is additionally provided a torque sensor for sensing the torque transmitted by the torquing mechanism and a feedback loop connected between said torque sensor and said control means, whereby the input signal to said control means is modified to compensate for non-linearities present in said torquing mechanism.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 2 is a view in perspective, partially exploded, of the torquing mechanism and torque sensor of the present invention.

Fig. 3 is a front view of a portion of the torquing mechanism of Fig. 2.

Figure 1:
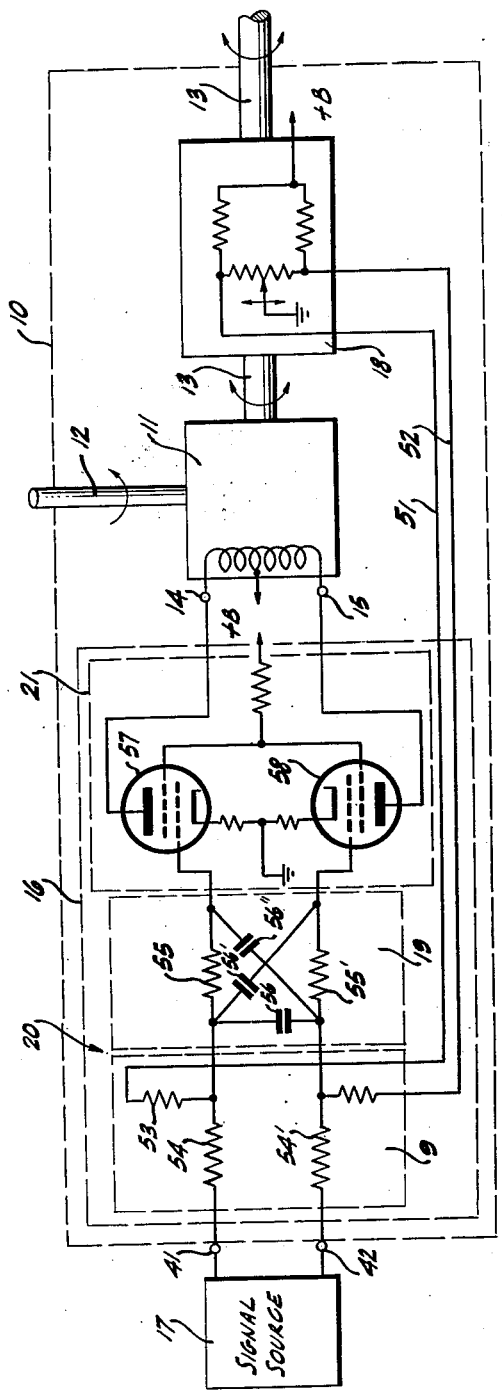
Fig. 1 is a block diagram including representative circuit elements of the clutch type servo-torquer system of the present invention, including a feedback loop for linearizing the response of the system.

Referring now to the drawings wherein like reference characters designate the same or similar elements in the several views, there is shown in Fig. 1 a servo-torquer system, according to the present invention, generally designated 10, which includes a torquing mechanism 11 having an input shaft 12 for receiving power from a rotating source of power, an output shaft 13 for supplying variable and reversible torque to a utilization device, not shown, and control means responsive to signals applied to a pair of input terminals 14, 15 for varying the coupling between input shaft 12 and output shaft 13, whereby torque forces corresponding to said received electrical input signals are produced on output shaft 13; and coupling means 16 for receiving electrical input signals from an external source of control signals 17 and applying the control signals to input terminals 14, 15.

As will be better understood following the detailed description of torquing mechanism 11 hereinafter set forth, coupling means 16 may comprise a pair of conductors for directly applying the control input signals from source 17 to input terminals 14, 15 in order to effect control of the output torque of the system. However, a more linear relationship between the output torque of the system and the applied input control signals, as well as other operating advantages, may be secured by providing in the system of the present invention feedback means comprising torque sensor 18 coupled to output shaft 13 for sensing the torque transmitted by torquing mechanism 11 and producing an electrical output signal corresponding thereto. Coupling means 16 may include a summing and correcting network 20, comprising a summing network 9 and a correcting network 19 for receiving control input signals from source 17 and the output signals from torque sensor 18, and an amplifying stage 21 for developing a modified control signal which is thereafter applied to input terminals 14, 15 of torquing mechanism 11.

More particularly, the signals supplied to the system from control signal source 17 are representative of the desired output torque from the system, while the output signals from torque sensor 18 are representative of the torque actually supplied to output shaft 13 by the system. These two signals are combined in summing network 9 to produce an output signal which is then applied to the control circuit of torquing mechanism 11 through correcting network 19 and amplifier 21. Summing network 9, correcting network 19 and amplifier 21 are so designed that the signal supplied by these units tends to correct any discrepancy between the desired output torque as represented by the control signal from source 17, and the output torque of the system represented by the signal from torque sensor 18, thereby providing a system having high accuracy and linearity. The specific structure and design requirements for summing network 9, correcting network 19, amplifier 21, and torque sensor 18 are set forth in greater detail hereinafter.

In order to permit a better understanding of the structural and design requirements for coupling circuit 16, a detailed description of torquing mechanism 11 and torque sensor 18 will now be set forth. As shown in Fig. 2, the torquing mechanism comprises an input shaft 12 for receiving power from a rotating source of power, not shown; a torque transmitter 22 coupled to the output shaft 13; and control means, comprising a shiftable shuttle assembly 23, for selectively and variably coupling the input shaft to the torque transmitter, and electrical means 24 for shifting the shuttle assembly in response to input signals applied thereto, thereby controlling the amplitude and direction of the torque transmitted from the input shaft 12 to the output shaft 13.

More particularly, the torquing mechanism includes the input shaft 12 coupled to a motor 25, which may be arranged to rotate continuously. A spinner 26 is mounted on shaft 12, the surface of the spinner being covered with a material having a high coefficient of friction, such as brake lining material, thereby forming a clutch surface 27 on spinner 26.

Torque transmitter 22 which is shown displaced from its normal position in order to permit better illustration of the present invention, comprises the rotatable output shaft 13 mounted, by means not shown, at right angles to, and spaced apart from, input shaft 12 and spinner 26; a torque reaction plate 28 pivotally mounted thereon, and coupled thereto; and a pair of thin semi-circular vanes 30 and 31, lying in parallel planes at right angles to shaft 13 and being rigidly fastened to the reaction plate 28. Shaft 13, reaction plate 28 and vanes 30 and 31, are each positioned and dimensioned so that the outer rim of each of vanes 30 and 31 is disposed on an opposite side of spinner wheel 26, with the facing surfaces of each of the two vanes almost in contact with, or lightly in contact with, clutch surface 27 along diametrically opposed lines. Reaction plate 28 may be coupled directly to shaft 13 by means of a pin, or alternatively, as shown in Fig. 2, a torque sensor 18 may be utilized to couple the plate to output shaft 13, at the same time providing an electrical ouput signal representative of the torque forces transmitted therethrough.

Torque transmitter 22 is selectively and variably coupled to input shaft 12 by means of a shiftable shuttle assembly 23, the amplitude and direction of the shift serving to control the amplitude and direction of the torque appearing on output shaft 13. Shuttle assembly 23 is shifted by electrical means comprising an electro-magnetic actuator 24, which is responsive to electrical signals applied to input terminals 14, 15 for effecting such shift.

More particularly, shiftable shuttle assembly 23 is arranged to vary the normal force coupling vanes 30 and 31 to clutch surface 27 by applying lateral forces to the outer side of each vane at points opposite spinner 26. The assembly includes a shuttle 32 having an elliptical opening therein through which shaft 12 passes, and a pair of free-rolling idler bearings 33 and 34 mounted thereon in such position that each bearing lightly bears on the outside surfaces of vanes 30 and 31, respectively, opposite the line of contact between the associated vane and clutch surface 27 when the shuttle assembly is in a neutral, or zero torque output position. Alternatively, bearings 33 and 34 may be considered as being positioned on diametrically opposite sides of spinner 26, with their axes lying in a plane common to the axis of spinner 26, while vanes 30 and 31 each lie in a plane perpendicular to said common plane, the vanes being positioned between bearing 33 and spinner 26, and spinner 26 and bearing 34, respectively.

Shuttle 32 is arranged to be mechanically shiftable along an axis parallel to the axis of output shaft 13 at right angles to the plane of rotation of vanes 30 and 31 by electrical means, comprising electro-magnetic actuator or differential relay 24. It will be recognized from the previous description of the relative spacing of clutch surface 27, vanes 30 and 31 and idler bearings 33 and 34, that motion of shuttle 32 in a direction toward electro-magnetic actuator 24 will cause idler bearing 33 to force vane 30 into more intimate contact with clutch surface 27, thereby increasing the force coupling clutch and vane, resulting in an increase in the torque transmitted through vane 30 to torque reaction plate 28 and thence to output shaft 13. At the same time, idler bearing 34 will be moved away from vane 31, and the vane will be relatively free to turn with the torque reaction plate. Similarly, motion of shuttle 32 in a direction away from actuator 24 will cause idler bearing 34 to force vane 31 into more intimate contact with clutch surface 27 resulting in an increase in the torque transmitted through vane 31 to the output shaft, while at the same time vane 30 will be relatively free to turn with the output shaft. It will be readily recognized that the direction of torque produced in output shaft 13 is a direct function of the direction in which shuttle 32 is shifted and that the amplitude of the torque will be a function of the force with which idler bearings 33 and 34 urge vanes 30 and 31 against clutch surface 27.

In order to provide a simple electrical means for shifting shuttle 32, electro-magnetic actuator 24 is utilized. As shown in Fig. 2, actuator 24 comprises two magnet coils 35 and 36 and an armature 37 pivotally mounted at its mid-point by means of a spring mounting 38 having a bearing extending in a vertical plane. Coils 35 and 36 of electro-magnetic actuator 24 are arranged to apply magnetic pull to opposite ends of armature 37 depending upon which of the coils is energized by means of electrical currents applied at input terminals 14, 15.

In order to provide for differential energization of coils 35 and 36, each of the coils has an end connected to one of input terminals 14, 15, respectively, while the other end of each coil is connected to a common return, shown as +B. Alternatively, two input terminals may be utilized for each coil where desired. It will be cognized that if the pull of one of the coil magnets is greater than the pull of the other, armature 37 will pivot about the vertical bearing of mounting 38. Shuttle 32 is coupled to armature 37 at a point removed from mounting 38 by means of a coupling pin 40, and accordingly the rotational motion of armature 37 will appear at pin 40 as translational motion. This translational motion in turn is coupled through pin 40 to shuttle 32, resulting in a movement of shuttle 32 which is a function of the amplitude and direction of motion of armature 37, and in turn a function of the differential of the magnetization produced by the currents flowing in coils 35 and 36. It will thus be recognized that the torque produced on output shaft 13 is a function in both amplitude and direction of the differential of coil curents flowing in coils 35 and 36.

The response of the system thus described to an actuating current flowing in one of coils 35 and 36 may be better understood by considering Fig. 3, which represents a front view of a portion of the previous figure taken under the assumption that shuttle 32 has been shifted toward electro-magnetic actuator 24 due to an excess of current flowing in coil 35 over that flowing in coil 36. As shown in Fig. 3, shuttle 32 has shifted to the right, as shown by the arrow, thereby urging bearing 33 against vane 30, and the vane against clutch surface 27, thereby increasing the torque transmitted from input shaft 12 through vane 30, torque reaction plate 28 and torque sensor 18 to output shaft 13. At the same time, idler bearing 34 has been moved away from vane 31, thereby leaving the vane relatively free to turn with output shaft 13.

Figure 4:
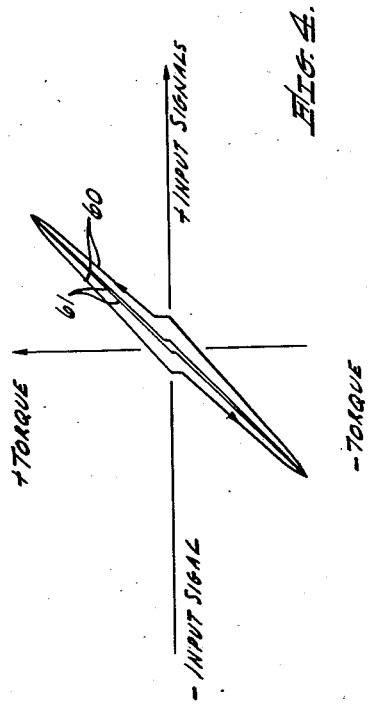
Fig. 4 is a plot of output torque versus applied input signal for the system of Fig. 1 with and without the feedback loop.

The response of the system thus described to applied input control signals may also be illustrated by means of a plot of output torque vs. applied input control signal. Referring now to Fig. 4, there is shown a plot of output torque against applied input control signals for the torquing mechanism of Fig. 2 alone, and for the servo-torquer system of Fig. 1 including the torquing mechanism of Fig. 2.

More particularly, the response of the torquing mechanism alone has been depicted by curves 60, while the response of the overall servo-torquer system of Fig. 1 has been depicted by curves 61. In each case, the output torque, in arbitrary units, is represented by the ordinate of the curve. However, in the case of the torquing mechanism alone, that is, curves 60, the abscissa of the curve represents, again in arbitrary units, the voltage signal applied to input terminals 14, 15, while for the entire system, that is, curves 61, the abscissa of the curve represents the voltage signal applied to input terminals 41, 42 of coupling means 16 by signal source 17 as shown in Fig. 1.

It will immediately be recognized that curves 60 are substantially linear, and that the output torque of the mechanism is an almost direct function of the voltage differential of the input control signals applied to the mechanism. Such variations in linearity as may be present may be attributed to a number of causes. For example, inherent variations in the friction coefficient of the vanes when the voltage signals are being increased as opposed to the friction coefficient during decreasing voltage signals, as well as hysteresis and like effects in the electromagnetic actuator, tend to cause curves 60 to have a shape somewhat similar to the familiar hysteresis curve of magnetic circuits. Similarly, discontinuities in curves 60 about the origin may be introduced by improper adjustment of the relative spacing of the various elements of the torquing mechanism. One other phenomenon common to clutch type devices, that of chatter, while not appearing on the plot of curves 60 may be present, depending on the materials and condition of the various elements of the mechanism.

All of the above effects may be substantially reduced by a factor corresponding approximately to the gain of the servo loop by utilizing the torquing mechanism of the present invention in the servo-torquer system of Fig. 1. As previously set forth, such a system includes a torque sensor, coupled to the output shaft of the torquing mechanism for sensing the torque appearing thereon and producing an electrical output signal corresponding thereto; and a coupling circuit for receiving electrical input signals from the external signal source and the output signals from the torque sensor and supplying an input control signal to the control circuit of the torquing mechanism, whereby torque forces corresponding to the received electrical input signals are produced on the output shaft.

More particularly, as shown in Fig. 2, the torque sensor of the present invention, generally designated 18, is coupled intermediate torque reaction plate 28 and output shaft 13, and includes a torque deflection sensor 43 coupled to the torque reaction plate 28 by means of a pair of flexible springs 44 and 45, and to the output shaft 13 by means of a pair of torque lever arms 46 and 47.

Torque sensor 18 accordingly comprises a slightly flexible coupling means for coupling torque forces appearing in plate 28 about the axis of shaft 13 to shaft 13, the amount of flexure appearing as a displacement of sensor 43 with respect to reaction plate 28. In other words, a relative rotation of torque reaction plate 28 with respect to shaft 13, which arises with the application of torque forces therebetween, will be coupled through lever arms 46 and 47 to produce a flexure of springs 44 and 45 and a corresponding mechanical deflection of torque sensor 43, the deflection produced being proportional to the torque forces applied between the reaction plate and the output shaft.

A torque sensing potentiometer 48 is mounted on torque reaction plate 28, and has its movable contact, depicted as an arm 50, rigidly coupled to deflection sensor 43, whereby deflections of sensor 43 with respect to plate 28 cause arm 50 to slide along potentiometer 48, thereby producing a variation in the resistance between the movable contact of the potentiometer and the ends of the potentiometer winding. These variations in resistance may be converted to a corresponding electrical output signal by energizing the potentiometer by means of an external voltage source, not shown, the desired output signals being taken between the movable contact of the potentiometer and either or both ends of the potentiometer winding.

Referring again to Fig. 1, control circuit 16, as previously set forth, comprises a summing and correcting network 20 for receiving control input signals from source 17 on a pair of input terminals 41, 42, and the output signals from torque sensor 18, for producing a modified control signal which is thereafter applied through an amplifying stage 21 to input terminals 14, 15, of torquing mechanism 11. More particularly, summing and correcting network 20 comprises a summing network 9 and a correcting network 19. Summing network 9 may be any of the conventional circuits for receiving a control input signal and a feedback signal and producing an output signal, the feedback signal being supplied from torque sensor 18 by means of a pair of conductors 51 and 52. Where the signals fed back over conductors 51 and 52 correspond to negative feedback, summing network 9 may be of the additive or summing type, such as the resistive adding circuit comprising resistors 53, 54 and 53', 54', schematically depicted. Alternatively, if the feedback is in a positive sense network 9 may be of the differential or subtractive type. Ordinarily, the sense of the feedback signal may be most conveniently determined by energizing torque sensor 18 from a source of appropriate polarity. Network 20 contains in addition to the signal combining elements heretofore set forth, a correcting network 19 comprising resistors 55, 55' and capacitors 56, 56' and 56", for modifying the frequency response of the system in order to eliminate regenerative feedback which may be present over a portion of the frequency spectrum, and for generally effecting a uniform frequency response for the system. Such corrective networks are well known in the art and accordingly a detailed description is not herein set forth.

Network 20 has its output circuit connected to the input circuit of an amplifying stage 21 which in turn has its output circuit connected to input terminals 14 and 15 of torquing mechanism 11. Amplifying stage 21 may be of the conventional push-pull type, comprising a pair of vacuum tubes 57 and 58 connected in push-pull as schematically depicted in Fig. 1, where terminals 14 and 15 are arranged to provide for differential energization of electro-magnetic actuator or differential relay 24 previously described, and may have an appropriately selected gain for producing the desired reduction in non-linearities and other phenomena heretofore described. Alternatively, amplifier 21 may be of any desired form appropriate for driving actuator 24. In general, the improvement in operating performance achieved for the system will correspond to the gain of this amplifier stage where network 20 is a 1:1 passive network or, in other words, non-linearities and discontinuities will be reduced by a factor equal to the stage gain with respect to the non-linearities present when torquing mechanism 11 is utilized alone. The maximum gain which can be utilized ordinarily will be determined by the desired frequency response of the system in accordance with well known servo-mechanism principles. A gain of ten has been found to be practical for the system as described.

Referring again to Fig. 4, curves 61 depict the response of the system thus described to input control signals. It will immediately be recognized that curves 61 are much more linear than curves 60 and that the discontinuities about the origin of curves 60 have been substantially reduced. In addition the system described in operation will be found to be relatively free from chatter and the other effects normally present in clutch-type torquing mechanisms.

There has thus been described a clutch-type servo-torquer system comprising a torquing mechanism having an input shaft for receiving power from a rotating source of power, a torque transmitter coupled to an output shaft, and control means responsive to an electrical input signal for selectively and variably coupling the input shaft to the torque transmitter; a torque sensor mounted on the output shaft for sensing the output torque appearing thereon; and a feedback loop connected between the torque sensor and the control means whereby the input signal to the control means is modified to provide a torque output on the output shaft corresponding to the applied electrical input signal.

What is claimed is:

1. A servo-torquer system for receiving electrical control signals representative of desired output torque and producing torque corresponding thereto on an output shaft, said system comprising: a torquing mechanism having an input shaft and an output shaft, said input shaft being coupled to a continuously rotating source of input power, said output shaft being adapted for coupling to a torque utilization device, said torquing mechanism including controlled coupling means having an input circuit and being responsive to output control signals applied thereto for selectively and variably coupling said input shaft to said output shaft, whereby torque forces substantially proportional to said output control signals are transmitted to said output shaft; a torque sensor coupled intermediate said controlled coupling means and said output shaft, said sensor being adapted to produce an electrical output signal representative of the torque transmitted to said output shaft; a summing and correcting network having a first input circuit for receiving electrical control signals representing desired output torque and a second input circuit electrically connected to said torque sensor for receiving said electrical output signals, said network being responsive to signals applied to said first and second input circuits for producing a sum signal corresponding to the sum of said signals applied to said first and second input signals; and an amplifier interconnecting the output circuit of said summing and correcting network and the input circuit of said controlled coupling means for applying the sum signals from said network to said controlled coupling means, whereby the signal supplied to said controlled means by said amplifier tends to correct any discrepancy between the desired output torque represented by said electrical control signal and the output torque of the system represented by the signal produced by said torque sensor.

2. A clutch-type torquing mechanism comprising: an input shaft for receiving power from a rotating source of power, said shaft having a clutch-surfaced spinner mounted thereon; a rotable output shaft mounted at right angles to, and spaced apart from, said input shaft; a pair of semi-circular vanes pivotally mounted on said output shaft, and coupled thereto, said vanes and said output shaft being arranged in such manner that the facing surfaces of each vane are lightly in contact with the surface of said spinner along diametrically opposing lines; and a shiftable shuttle assembly for selectively and variably forcing one and the other of said vanes into more intimate contact with said spinner.

3. The mechanism defined in claim 2, wherein said shiftable shuttle assembly includes a shuttle shiftable along an axis parallel to the axis of said output shaft, and a pair of free-rolling idler bearings, mounted on said shuttle, said bearings being mounted to make contact with the outside surface of said semi-circular vanes, respectively, opposite the line of contact between said vane and said spinner.

4. A clutch-type torquing mechanism comprising: an input shaft for receiving power from a rotating source of power, said shaft having a clutch-surfaced spinner mounted thereon; a rotable output shaft mounted at right angles to, and spaced apart from, said input shaft; a torque reaction plate pivotally mounted on said output shaft; a pair of semi-circular vanes rigidly fastened to said reaction plate, said vanes lying in parallel planes at right angles to said output shaft, said output shaft, reaction plate and vanes being positioned and dimensioned such that the facing surface of each vane is disposed on an opposite side of said spinner; means for coupling said torque reaction plate to said output shaft; and a shiftable shuttle assembly for selectively and variably forcing one and the other of said vanes into more intimate contact with said spinner.

5. The torquing mechanism defined in claim 4 wherein said means for coupling said torque reaction plate to said output shaft comprises a torque sensor for sensing the torque transmitted therethrough and producing an electrical output signal corresponding thereto.

6. In a servo-torquer system, a clutch-type torquing mechanism comprising: an input shaft for receiving power from a rotating source of power; a clutch-type surfaced spinner mounted on said input shaft; a shiftable shuttle assembly including a shuttle having a pair of free-rolling idler bearings mounted thereon, said bearings being positioned on diametrically opposite sides of said spinner, with their axes lying in a plane common to the axis of said spinner; a rotable output shaft mounted at right angles to, and spaced apart from, said input shaft; a torque reaction plate pivotally mounted on said output shaft, said plate having a pair of semi-circular vanes rigidly fastened thereto, said vanes lying in planes at right angles to said common plane, said torque reaction plate being mounted on said output shaft and positioned so that the outer rim of each vane is disposed between one of said bearings and said spinner respectively; means for coupling said torque reaction plate to said output shaft; and electrical means for shifting said shiftable shuttle assembly along an axis parallel to the axis of said output shaft.

7. A servo-torquer system comprising: a torquing mechanism including an input shaft for receiving power from a rotating source of power, a torque transmitter, control means responsive to an electrical input signal for selectively and variably coupling said input shaft to said torque transmitter, an output shaft, a torque sensor for coupling said torque transmitter to said output shaft and producing an electrical output signal corresponding to the torque applied to said output shaft from said torque transmitter; and a feedback loop connected between said torque sensor and said control means for modifying the input signal applied to said control means by at least a portion of the signal produced by said torque sensor to compensate for non-linearities present in said torquing mechanism.

8. A servo-torquer system comprising: a torquing mechanism having an input shaft for receiving power from a rotating source of power, a torque transmitter, control means for selectively and variably coupling said input shaft to said torque transmitter, said control means having a pair of input terminals for receiving electrical input signals and being responsive to input signals applied thereto for effecting coupling between said input shaft and said torque transmitter, and an output shaft; and feedback means comprising a torque sensor for coupling said torque transmitter to said output shaft and producing an electrical output signal corresponding to the torque applied to said output shaft from said torque transmitter, and a control circuit, comprising a summing and correcting network and an amplifier stage, having a first input circuit for receiving control input signals from an external source and a second input circuit connected to said torque sensor for receiving said electrical output signal, and an output circuit connected to said input terminals of said control means, the said control circuit being responsive to the signals applied to said first and second input circuits for producing a modified control signal on its output circuit, whereby torque forces linearly corresponding to said received electrical input signals are produced on the output shaft of said torquing mechanism.

References Cited in the file of this patent

UNITED STATES PATENTS

| | | |
|---|---|---|
| 1,013,989 | Daeuble | Jan. 9, 1912 |
| 1,368,283 | Olds | Feb. 15, 1921 |
| 1,846,687 | Mentor | Feb. 23, 1932 |
| 2,178,641 | Neuman | Nov. 7, 1939 |
| 2,590,029 | Minorsky | Mar. 18, 1952 |

FOREIGN PATENTS

| | | |
|---|---|---|
| 690,982 | Great Britain | May 6, 1953 |